(12) United States Patent
Reial et al.

(10) Patent No.: US 10,849,096 B2
(45) Date of Patent: *Nov. 24, 2020

(54) FLEXIBLE CONFIGURATION OF PAGING SIGNALS

(71) Applicant: Telefonaktiebolaget LM Ericsson (publ), Stockholm (SE)

(72) Inventors: Andres Reial, Malmo (SE); Jose Luis Pradas, Stockholm (SE); Johan Rune, Lidingo (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/258,617

(22) Filed: Jan. 27, 2019

(65) Prior Publication Data

US 2019/0159169 A1 May 23, 2019

Related U.S. Application Data

(63) Continuation of application No. 15/322,100, filed as application No. PCT/EP2016/061130 on May 18, 2016, now Pat. No. 10,231,209.

(51) Int. Cl.
*H04W 68/02* (2009.01)
*H04W 68/00* (2009.01)
(Continued)

(52) U.S. Cl.
CPC .......... *H04W 68/02* (2013.01); *H04W 28/06* (2013.01); *H04W 68/005* (2013.01); *H04W 72/08* (2013.01)

(58) Field of Classification Search
CPC ... H04W 68/00; H04W 68/005; H04W 68/02; H04W 68/025; H04W 72/042;
(Continued)

(56) References Cited

U.S. PATENT DOCUMENTS 5,625,629 A * 4/1997 Wenk .................... H04W 28/06
340/7.43
5,729,540 A * 3/1998 Wegrzyn ............... H04J 3/1682
370/336
(Continued)

FOREIGN PATENT DOCUMENTS

EP 0951192 A1 10/1999
EP 2348759 A1 7/2011
(Continued)

OTHER PUBLICATIONS

PCT International Search Report, dated Mar. 9, 2017, in connection with International Application No. PCT/EP2016/066546, all pages.
(Continued)

*Primary Examiner* — Matthew C Sams
(74) *Attorney, Agent, or Firm* — Patent Portfolio Builders, PLLC

(57) ABSTRACT

The disclosure relates to methods, devices, and computer programs in mobile communications. More specifically the disclosure relates to a method, performed in a network node, for paging a wireless device. The method comprises determining parameters for a paging transmission, obtaining two or more possible paging transmission formats, selecting one of the two or more possible paging transmission formats, based on the determined parameters and transmitting the paging transmission using the selected paging transmission format. The disclosure also relates to methods is a wireless for receiving a paging and to corresponding devices and to a computer program for executing the proposed methods.

38 Claims, 7 Drawing Sheets

(51) Int. Cl.
*H04W 28/06* (2009.01)
*H04W 72/08* (2009.01)

(58) Field of Classification Search
CPC .............. H04W 52/0216; H04W 28/06; H04W 48/12; H04W 48/16; H04W 4/00; H04W 4/70; H04W 52/0219; H04W 52/0229; H04W 52/545; H04W 68/08; H04W 72/0426; H04W 72/0446; H04W 72/0453; H04W 72/08; H04W 72/12; H04W 72/1205; H04W 76/10; H04W 76/19; H04W 76/20; H04W 76/28; H04W 84/18; H04W 88/08; H04W 8/186; H04W 84/027; H04W 88/185; H04B 1/707; H04B 7/2678; H04J 3/1682; H04L 12/4633; H04L 1/0007; H04L 2212/00; H04L 51/38; H04L 5/0007; H04L 5/003; H04L 5/0053; H04L 5/0091; H04L 61/6054; H04L 9/0847; Y02D 70/124; Y02D 70/1262; Y02D 70/142; Y02D 70/144; Y02D 70/164; Y02D 70/24; Y02D 70/449

See application file for complete search history.

(56) References Cited

U.S. PATENT DOCUMENTS

| | | | | |
|---|---|---|---|---|
| 8,848,641 | B2* | 9/2014 | Fong | H04W 24/10 370/329 |
| 9,131,464 | B2* | 9/2015 | Montojo | H04W 68/02 |
| 10,231,209 | B2* | 3/2019 | Reial | H04W 4/20 |
| 2008/0182596 | A1* | 7/2008 | Wang | H04W 68/025 455/458 |
| 2009/0143072 | A1* | 6/2009 | Montojo | H04W 68/02 455/450 |
| 2010/0279628 | A1* | 11/2010 | Love | H04L 5/003 455/70 |
| 2011/0051668 | A1* | 3/2011 | Lee | H04W 68/02 370/328 |
| 2012/0172064 | A1* | 7/2012 | Willey | H04W 68/025 455/458 |
| 2012/0282956 | A1* | 11/2012 | Kim | H04L 51/38 455/466 |
| 2013/0252606 | A1* | 9/2013 | Nimbalker | H04B 17/309 455/434 |
| 2015/0215474 | A1 | 7/2015 | Thompson | |
| 2015/0289228 | A1* | 10/2015 | Sikri | H04W 52/0238 370/311 |
| 2017/0064625 | A1 | 3/2017 | Sampath et al. | |

FOREIGN PATENT DOCUMENTS

| | | |
|---|---|---|
| EP | 2503833 A1 | 9/2012 |
| WO | 2013016862 A1 | 2/2013 |
| WO | 2016007847 A2 | 1/2016 |

OTHER PUBLICATIONS

PCT Written Opinion, dated Mar. 9, 2017, in connection with International Application No. PCT/EP2016/066546, all pages.
Kyocera, Initial Consideration of Paging Enhancements for Light Connection, 3GPP TSG-RAN WG2 #93bis, R2-162717, Dubrovnik, Croatia, Apr. 11-15, 2016, 3 pages.
Miloud Bagaa et al., Efficient Tracking Area Management Framework for 5G Networks, IEEE Transactions on Wireless Communications, vol. 15, No. 6, Jun. 2016, pp. 4117-4131.
Patrick Marsch et al., White Paper Preliminary Views and Initial Considerations on 5G RAN Architecture and Functional Design, Mar. 8, 2016, pp. 1-27.
Ming-Hung Tao et al., Location-Based Paging Mechanism in 16m, IEEE C802.16m-08/579r1, iEEE 802.16 Broadband Wireless Access Working Group, Jul. 7, 2008, 5 pages.
PCT International Search Report, dated Dec. 9, 2016, in connection with International Application No. PCT/EP2016/061130, all pages.
PCT Written Opinion, dated Dec. 9, 2016, in connection with International Application No. PCT/EP2016/061130, all pages.
Non-Final Office Action dated May 24, 2018 in connection with U.S. Appl. No. 15/570,281, 20 pages.

* cited by examiner

Paging transmission

FLEXIBLE CONFIGURATION OF PAGING SIGNALS

CROSS-REFERENCE TO RELATED APPLICATIONS

This application claims the benefit of U.S. application Ser. No. 15/322,100 filed Dec. 23, 2016 (371(c) date), which is a 35 U.S.C. § 371 national stage of international application PCT/EP2016/061130 filed May 18, 2016. All of these earlier applications are hereby incorporated herein by reference in their entireties.

TECHNICAL FIELD

The present disclosure relates to mobile communications. More specifically, the proposed technique relates to methods for providing flexible configuration of paging signals. The disclosure also relates to corresponding devices and to a computer program for executing the proposed methods.

BACKGROUND

The 3rd Generation Partnership Project, 3GPP, is responsible for the standardization of the Universal Mobile Telecommunication System, UMTS, and Long Term Evolution, LTE. The 3GPP work on LTE is also referred to as Evolved Universal Terrestrial Access Network, E-UTRAN. LTE is a technology for realizing high-speed packet-based communication that can reach high data rates both in the downlink and in the uplink and is thought of as a next generation mobile communication system relative to UMTS. In order to support high data rates, LTE allows for a system bandwidth of 20 MHz, or up to 100 MHz when carrier aggregation is employed. LTE is also able to operate in different frequency bands and can operate in at least Frequency Division Duplex, FDD, and Time Division Duplex, TDD, modes.

In an UTRAN and an E-UTRAN, a User Equipment, UE, or a wireless device is wirelessly connected to a Radio Base Station, RBS, commonly referred to as a NodeB, NB, in UMTS, and as an evolved NodeB, eNodeB or eNB, in LTE. A Radio Base Station, RBS, or an access point is a general term for a radio network node capable of transmitting radio signals to a UE and receiving signals transmitted by a UE. In Wireless Local Area Network, WLAN, systems the wireless device is also denoted as a Station, STA.

In 5G, i.e. 5th generation mobile networks, there will be evolvement of the current LTE system to 5G. The main task for 5G is to improve throughput and capacity compared to LTE. This is achieved by increasing the sample rate and bandwidth per carrier. 5G is also focusing on the use of higher carrier frequencies i.e. above 5-10 GHz.

In 5G, development takes one step further by connecting not only individuals but also all sorts of machines in real time. The Machine Type Communication, MTC system should in particular allow for radio resource management that allows the coexistence between different classes of applications having such as; sporadic data, e.g., alert messages, periodic data, and others with e.g. real-time data (or simply best-effort data). These different types of applications have different requirements on the 5G network.

In view of MTC, one requirement of the radio concepts to be used in 5G is to support low power devices. In a couple of years, 50 billion devices are expected to be connected through wireless networks generating the so called Internet of Things, IoT. Many of these being simple sensor devices that typically transmit small amounts of data seldom. One parameter that is vital for the enablement and success of IoT is power consumption. 10 years' longevity is a timeframe adopted by industry and which requires great resource frugality both in the communications modules as in the sensor or actuator modules of the device.

One further requirement on the radio concepts to be used in 5G, is to support highly reliable ultra-low delay Machine-Type Communication, MTC, i.e., Critical-MTC. The Critical-MTC concept should address the design trade-offs regarding e.g., end-to-end latency, transmission reliability, system capacity and deployment, and provide solutions for how to design a wireless network for different industrial-application use cases. The Critical MTC system should in particular allow for radio resource management that allows the coexistence between different classes of applications: sporadic data, e.g., alert messages, periodic data, and others with e.g. real-time data (or simply best-effort data).

In cellular communication systems such as LTE, paging messages are used to page UEs being in idle mode about mobile terminated calls. A paging message can also be used as a trigger for a UE to read system-information or to provide indication from a public warning system.

In LTE, any data transmission succeeding the paging generally requires the UE to move from Idle Mode to Connected Mode, which results in a relatively large amount of signalling being exchanged between the UE and the network.

The currently proposed 5G specifications should allow adaptation of the present paging mechanisms to support certain special scenarios. This adaptation consists e.g. of repetition of paging messages for the purpose of coverage extension for low complexity, cost MTC devices or robustness improvement for UEs with extra-long DRX cycles.

However, considering the diversity in terms of supported services, UE types, as well as deployments and use cases for 5G networks, further mechanisms aiming at defining communications mechanisms that enable optimizing network performance, despite the different requirements of the different types of applications and devices are also desirable.

SUMMARY

An object of the present disclosure is to provide methods, devices configured to execute methods, and computer programs which seek to mitigate, alleviate, or eliminate one or more of the above-identified deficiencies in the art and disadvantages singly or in any combination.

This object is achieved by a method, performed in a network node, for paging a wireless device. The method comprises determining parameters for a paging transmission, obtaining two or more possible paging transmission formats selecting one of the two or more possible paging transmission formats, based on the determined parameters; and transmitting the paging transmission using the selected paging transmission format. The proposed method provides an improved paging solution for 5G networks that are increasingly diverse in terms of supported services and UE types, as well as deployments and use cases. By letting the network node select of an appropriate paging transmission format for a given paging message, network performance is potentially optimized.

According to some aspects, in one of the two or more possible paging transmission formats the paging transmission comprises only a paging indicator. In another paging transmission format, the paging transmission comprises a paging indicator comprising a pointer to one or more paging messages. According to some aspects, one or more of the paging messages comprises a pointer to one or more further paging messages. Hence, the proposed methods enable conveying messages of varying sizes via broadcast mechanisms minimizing latency for time-sensitive messages, etc. This is in contrast to standard paging mechanisms where typically a single paging format is used that is a compromise between the needs of different types of messages and does not maximize performance of the individual paging occasions.

The disclosure also proposes a method, performed in a wireless device for receiving a paging transmission from a network node. The method comprises obtaining information defining two or more possible paging transmission formats, and receiving a paging transmission in accordance with the two or more possible paging transmission formats. Selecting the appropriate transmission format for the given paging message allows optimizing UE performance e.g. by enabling adaptations to link conditions and allowing for paging detection with simple receiver structure and/or low energy consumption.

According to some aspects the disclosure proposes a network node, in a communication system, the network node being configured for paging a wireless device. The network node comprises a radio communication interface configured for communication with wireless devices and processing circuitry. The processing circuitry is configured to cause the network node to determine parameters for a paging transmission, to obtain two or more possible paging transmission formats, to select one of the possible paging transmission formats, based on the determined parameters; and to transmit the paging transmission using the selected paging transmission format.

According to some aspects the disclosure proposes a wireless device configured for receiving a paging transmission from a network node. The wireless device comprises a radio communication interface configured to communicate with the network node; and processing circuitry. The processing circuitry is configured to cause the wireless device to obtain information defining two or more possible paging transmission formats, and to receive a paging transmission in accordance with the two or more possible paging transmission formats.

According to some aspects, the disclosure relates to a computer program comprising computer program code which, when executed, causes a wireless device or network node to execute the methods described above and below. According to some aspects the disclosure pertains to a computer program product or a computer readable medium holding said computer program.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

Figure 1A:
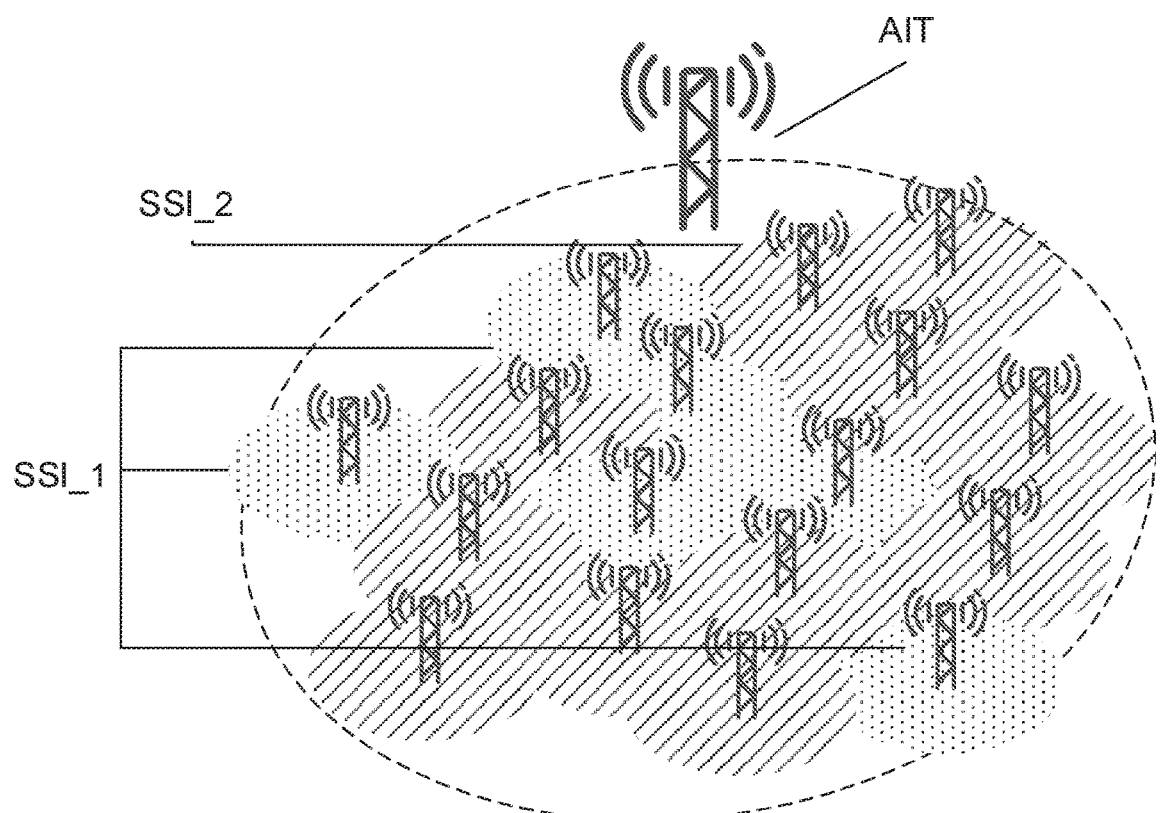
FIG. 1a depicts a set of nodes, wherein a subset of them is transmitting a first SSI and another subset is transmitting a second SSI.

Aspects of the present disclosure will be described more fully hereinafter with reference to the accompanying drawings. The apparatus and method disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise.

Traditionally, any data transmission to a wireless device requires the wireless device to move from Idle Mode to Connected Mode, in 5G sometimes referred to as dormant to active mode. This results in a relatively large amount of signaling data being exchanged between the wireless device and the network. This signaling load may be justified when there is a fair amount of user-data waiting to be delivered to the wireless device. However, the signaling load may be excessive when the amount of user data to be transmitted to the wireless device is limited and could be transmitted in a few resource blocks.

This disclosure proposes a light-weight mechanism to distribute small amounts of user data and thus reduce signaling load. The mechanism in based on introducing a paging mechanism where the paging message transmission format can be adapted to efficiently serve multiple purposes; traditional paging to make a wireless device enter active mode, transmitting a small amount of data to a wireless device without the wireless device entering the active mode emergency message and other broadcast message distribution, etc.

For better understanding of the proposed technique some main concepts of the future 5G systems will now be briefly discussed. Note that the 5G system is not yet standardized, so the description is based on concepts being presented and discussed by involved parties.

In LTE, "tracking" is a functionality which supports locating the UE. The network is broken down into Tracking Areas, TA. The network configures a UE with one or more tracking areas. This allows the network to locate the UE within a certain defined region. When the UE enters one tracking area which is not in the list provided by the network, the UE performs a tracking area update. This update assists the network to update the UE location information.

The method to indicate the tracking area is via system information. In LTE, the Tracking Area Code, TAC, is contained in System Information Block Type 1, SIB1. Therefore, the system information is location dependent i.e. it includes location information.

A proposed concept for a future 5G implementation is not to use the LTE system information concept. Instead, a new concept "System Control Plane, SCP" is introduced to enhance the functionality. The concept is illustrated in FIG. 1a. In this disclosure the SCP concept will be used as an example to explain the proposed methods. However, it must be understood that the same concept is generally applicable to any control plane. For example the proposed flexible paging approach may also be adopted in an LTE-like System Information approach.

The SCP concept is based on a node transmitting a System Signature Index, SSI, which points to an entry in the Access Information Table, AIT. The AIT is a collection of the different system information configurations that are used within a given area, which may be an entire PLMN or a region in a PLMN. These configurations should only carry, in principle, information related to the network access (e.g. random access parameters). FIG. 1a depicts a set of nodes, one subset of them transmitting SSI_1 and another subset transmitting SSI_2. Yet, another node, in a macro area, distributes the AIT which contains the random access parameters to access SSI_1 and SSI_2.

An issue is related to the SCP concept is that the AIT, Access Information Table, contains the minimum system information parameters which allow the wireless device to access the network. The AIT is neither dimensioned to carry thousands of bits nor dimensioned to be transmitted often. Thus, the AIT may not be a good mechanism to distribute indications related to warning systems (e.g. Earthquake and Tsunami Warning System, ETWS/Compatible Commercial Mobile Alert System, CMAS) or the extended barring mechanism for machine type communication (Extended Access Barring, EAB, in LTE). In general, the AIT is not a suitable mechanism for distributing dynamic information. Therefore, a new mechanism to deliver this type information is needed.

Hence, this disclosure proposes a paging mechanism where the paging message transmission format can be adapted to, in addition to traditional paging transmit a small amount of data to a wireless device, without the wireless device entering the active mode.

The traditional purpose of paging in is to inform a wireless device in idle mode about incoming data or about the presence of other new information, such as system information or emergency information that the wireless device needs to read. Traditionally any data transmission to the wireless device requires the wireless device to move from Idle Mode to Connected Mode, in 5G sometimes referred to as dormant to active mode. This results in a relatively large amount of signaling data being exchanged between the wireless device and the network.

For better understanding of the proposed technique the paging procedure in LTE will now be briefly discussed.

The purpose of paging in LTE is to transmit paging data to a UE in RRC_IDLE state and/or; to inform wireless devices in RRC_IDLE state and wireless devices in RRC_CONNECTED state about a system information change and/or; to inform about an ETWS primary notification and/or ETWS secondary notification and/or to inform about a CMAS notification.

Figure 1B:
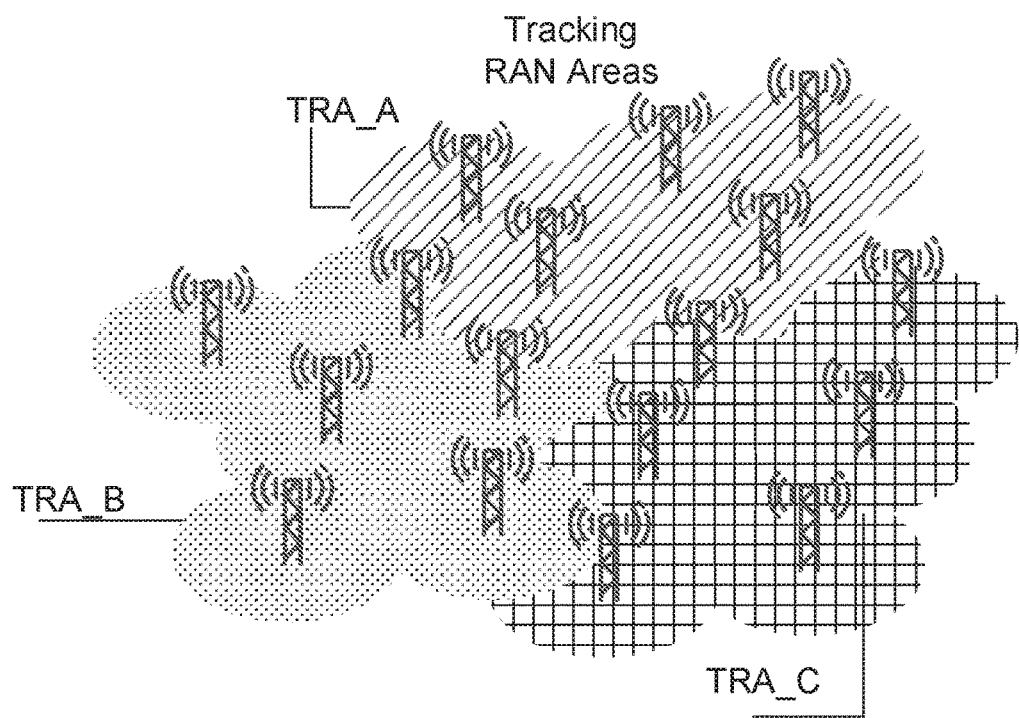
FIG. 1b depicts different tracking areas in a communication system.

In LTE as well as in the SCP concept, paging transmission is tied to the so called Tracking Areas, IRAs. As in LTE, it must be possible for one or more wireless devices or wireless device groups to be paged for the purposes of ordering network access, distributing emergency messages, etc. FIG. 1b depicts different IRAs (TRA_A to TRA_C).

The paging message in LTE includes a paging record—which comprises one or more wireless device identities and the Core Network domain, and different indications e.g. system information modification, Earthquake and Tsunami Warning System, ETWS, indication, Compatible Commercial Mobile Alert System, CMAS, indication, and Extended Access Barring, EAB, parameters modification indication.

When the network sends a paging message to the wireless device, the network associates the downlink scheduling assignment on the Physical Downlink Control Channel, PDCCH, to the Paging Radio Network Temporary Identifier, P-RNTI. All wireless devices which decode the P-RNTI will acquire the paging message which is transmitted on the Physical Shared Control Channel, PDSCH, in the indicated resources in the same time slot. The downlink scheduling assignment on the PDCCH indicates the resource blocks allocated on the PDSCH for the physical channel where the paging message is contained.

If end-user plane data is waiting in the network to be transmitted to a wireless device, the paging message will include a paging record with the identity of the wireless device for which data is waiting, and the wireless device will start the random access procedure to get a Radio Resource Control, RRC, connection. When the wireless device is in RRC_CONNECTED state, the network can transmit the user plane data on the downlink-Shared Channel, SCH/PDSCH.

If the paging message indicates a system information change, ETWS/CMAS flags, or EAB flags, the wireless device needs to read the system information and acquire the new/updated information according to how it is specified. In the case of warning messages, the system information block carrying such information may contain several hundreds of bits to deliver the message to all the wireless devices in a certain area.

The proposed techniques are based on the insight that the existing, rigid paging mechanism is a compromise, which results in suboptimal performance in many scenarios. The above mentioned adaptation mechanism in the form of repetition of the paging message is rudimentary, coarse and often resource inefficient. The static format selection approach is inflexible in a system with a wide range of device types and paging functions.

Therefore, this disclosure proposes a more flexible paging mechanism to serve the broad spectrum of scenarios and devices to be supported by 5G systems. In addition, this improved paging mechanism has to match the design principles of 5G networks, e.g. in terms of new principles for states, tracking and control signaling.

In the proposed solution the paging can be adapted and optimized to different deployment scenarios, wireless device capabilities, load conditions, resource limitations, operator preferences, etc. The use of different paging formats has already been implemented in UMTS. However, in UMTS the chosen format is indicated in system info and is static in nature and the same for everyone, i.e. not modified on the fly or per-wireless device. This disclosure moves one step further, and proposes that the transmission format for a given paging message is selected out of a set of available formats based on the contents of the message and other parameters, in order to optimize the tradeoff between radio resource utilization, delay, control signaling overhead, wireless device energy consumption and probability of successful reception. Furthermore, the paging can be adapted and optimized to different deployment scenarios, wireless device capabilities, load conditions, resource limitations, operator preferences, etc.

Example Operations in a Network Node

The proposed methods will now be described in more detail referring to FIG. 2. It should be appreciated that FIG. 2 comprises some operations and modules which are illustrated with a solid border and some operations and modules which are illustrated with a dashed border. The operations and modules which are illustrated with solid border are operations which are comprised in the broadest example embodiment. The operations and modules which are illustrated with dashed border are example embodiments which may be comprised in, or a part of, or are further embodiments which may be taken in addition to the operations and modules of the broader example embodiments. It should be appreciated that the operations do not need to be performed in order. Furthermore, it should be appreciated that not all of the operations need to be performed. The example operations may be performed in any order and in any combination.

Figure 2:
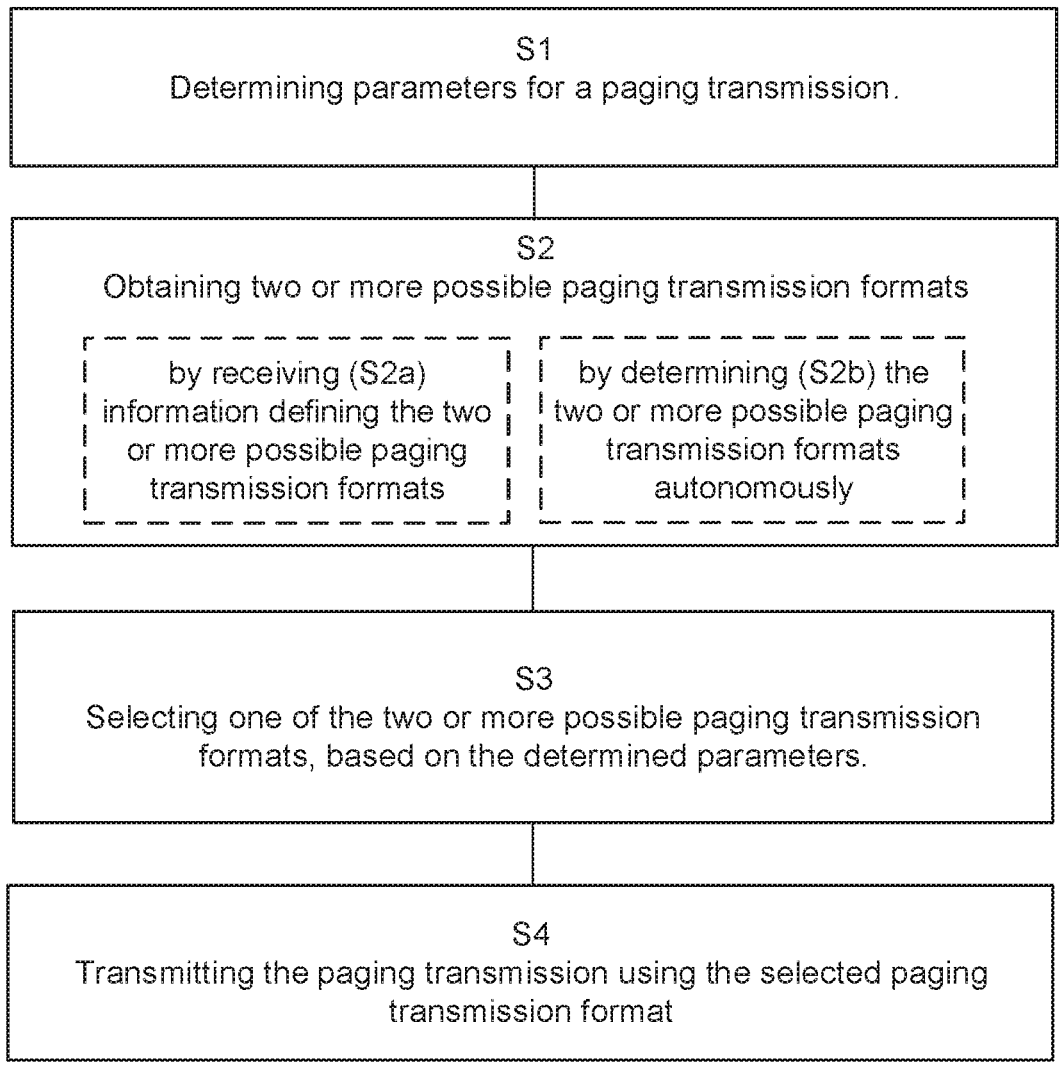
FIG. 2 is a flowchart illustrating method steps performed in a network node according to the proposed technique.

FIG. 2 illustrates a method, performed in a network node, for paging a wireless device. The method is performed at any time, when a network node, for example in one of the network nodes in FIG. 1a or 1b, when the network node has information that it wants to provide to a wireless device.

The method comprises, determining S1 parameters for a paging transmission. In other words, the contents and other parameters of a pending paging transmission and relevant deployment parameters are obtained. A paging transmission is herein defined as comprising both the paging indication e.g. the C-RNTI, and a succeeding paging record i.e. information included in the paging record such as paging messages in LTE. The determined parameters are for example parameters related to the purpose of the paging or to other requirements associated with the purpose of the paging such as latency constraints. The parameters might also be associated with the number of targeted wireless devices or wireless device groups. One example of such a parameter is the size of a list of targeted devices of a group cast. Other relevant parameters are related to the size of the paging record, such as paging data size or payload size. Transmission related parameters such as paging link quality and wireless device receiver constraints; network load and radio resource limitations might also be relevant.

The method further comprises obtaining S2 two or more possible paging transmission formats. This step implies that a set of possible paging transmission formats is formulated. Or stated differently, the network node determines a set of available paging transmission formats.

A receiving wireless device may be configured to detect a certain set of paging transmission format, either via RRC signaling (e.g. as broadcast or unicast system information) or as defined in the standard specifications.

According to some aspects, the network node retrieves the above parameters from various sources, such as by internal resource monitoring, capability indications received from the wireless devices, paging message content received from the core network, optimization targets configured via Operation and Maintenace, O&M, operations, subscription-related data received from the core network (which may include e.g. priority of the UE, capability constraints, predefined paging transmission format or transmission format restrictions, etc.). Hence, according to some aspects, the obtaining S2 comprises receiving S2a information defining the two or more possible paging transmission formats from another network node, such as from a core network node or a network node specifically configured for this purpose.

Alternatively, the obtaining S2 comprises determining S2b the two or more possible paging transmission formats autonomously in the network node. For example different paging transmission formats are possible or available based on parameters available in the network node such as load or traffic.

The obtaining S2 could also be implicit or assumed to be done in advance, once and for all. The set of available paging transmission formats may e.g. be based on the standard specification and/or the network configuration in the current deployment. For example all possible formats could be considered possible, or the network node could be pre-configured with one or a few possible paging transmission format. Hence, according to some aspects, the two or more possible paging transmission formats are pre-configured in the network node. Preconfigured paging transmission formats refers e.g. to fixed vendor or operator settings, as opposed to dynamically received or determined paging transmission formats.

The wireless device might detect individual paging messages blindly by attempting detection according to the possible formats as will be further described below.

The paging transmission format typically defines if the paging transmission is a single transmission or if the transmission is divided into several parts. The paging transmission format typically also defines the contents of the individual parts. If there are several parts the paging transmission format according to some aspects defines an inherent hierarchical (forward pointer) structure of the individual parts. The paging transmission format typically also defines the mapping of message parts to physical channels. Paging transmission formats will be described in more detail below.

The general intention for paging signaling design is to enable reception optimized for certain predetermined targets and constraints, e.g. minimizing wireless device energy consumption, minimizing delay (also known as latency), and maximizing probability of successful reception, while being resource-efficient for the network. The solution should make it sufficient for the wireless device to read a minimum number of signals, preferably just one, to know whether it has been paged or not. This is in contrast to LTE where the wireless device first needs to read PDCCH information with a pointer to PDSCH resources containing the paged wireless device list.

No new physical channels should be introduced for distributing paging information; the Physical Control Channel, PCCH and Physical Downlink Channel, PDCH, should be used for that purpose. It is expected that in the new radio interface of 5G, the subframes will be quite short (250 µs, 62.5 µs for 16 kHz and 67.5 kHz subcarrier spacing respectively), so the RF awake time, i.e. the time during which the RF circuitry is on/active, associated with reading the information in a subframe is typically negligible compared to the wake-up time uncertainty due to lack of synchronization, e.g. caused by clock drift.

The paging signals carried by PCCH/PDCH consist of a Paging Indicator Channel, PICH, field that indicates whether paging is in progress and provides partial or full paging information for the wireless device. PICH may optionally be followed by a Paging Message Channel, PMCH, with additional paging or notification information. The mapping of the logical fields to the physical channels is described below.

The method further comprises selecting, S3, one of the two or more possible paging transmission formats, based on the determined parameters. In other words it is determined which format that fits best for the paging transmission task at hand. The determined parameters are for example used to classify the message in one of a set of categories. A corresponding category index is then used to index a lookup table where the transmission format is fetched.

The method then finally comprises transmitting S4 the paging transmission using the selected paging transmission format. Finally, the page is transmitted using the selected/fetched format.

Example Operations in a Wireless Device

Figure 3A:
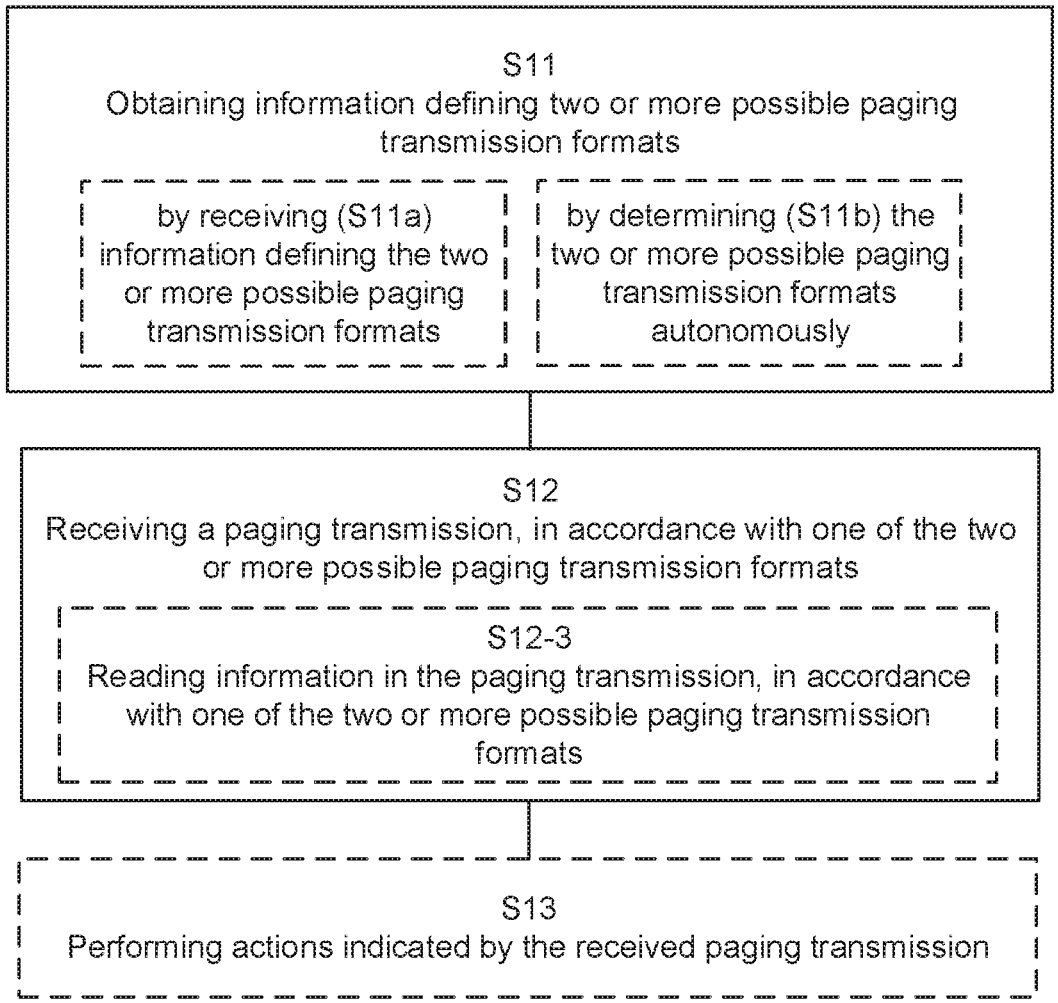
FIGS. 3a to 3c are flowcharts illustrating method steps performed in a wireless device according to the proposed technique.

A corresponding method, performed in a wireless device for receiving a paging transmission from a network node, will now be described referring to FIG. 3a. Hence, the method is performed in a wireless device that receives a paging described in relation to FIG. 2.

A wireless device receiving the paging discussed above, it typically informed about the different paging transmission formats. In other words, the method performed in a wireless device comprises obtaining S11 information defining two or more possible paging transmission formats. Typically there are a number of paging transmission formats defined e.g. in standardization. Under certain conditions, more than one of them is possible.

According to some aspects, the obtaining S11 comprises receiving S11a information defining the two or more possible paging transmission formats from the network node or determining S11b the two or more possible paging transmission formats autonomously in the wireless device. According to some aspects, the obtaining S11 comprises retrieving possible paging transmission formats that are being pre-configured in the wireless device. Thus, a wireless device may be configured to detect the paging by applying a certain set of different paging transmission formats, either via RRC signaling (e.g. as broadcast or unicast system information) or as defined in the standard specifications. Hence, if no information about a subset of the paging transmission formats in the specification is signaled, the wireless device according to some aspects the wireless device might have to do full blind detection over all possible paging transmission formats allowed.

The possible paging transmission formats comprise e.g. one paging transmission format where the paging transmission comprises only a paging indicator and one paging transmission format where the paging transmission comprises a paging indicator comprising a pointer to one or more paging messages, as discussed in detail above and below. According to some aspects one or more of the paging messages comprises a pointer to one or more further paging messages.

The method further comprises receiving S12 a paging transmission in accordance with the two or more possible paging transmission formats. This means typically that the wireless device obtains sync using System Signature Index, SSI, (described above) or other sync signal shortly before reading paging. The wireless device is then configured to monitor PICH according to the obtained possible paging transmission format(s). Hence, the wireless device detects the paging transmission by searching for a paging indicator on the PICH.

To be able to read or decode the paging data the wireless device needs to know, or at least assume, the format. Hence, according to some aspects the method comprises reading S12-3 information comprised in the received paging transmission in accordance with one of the two or more possible paging transmission formats.

Figure 3B:
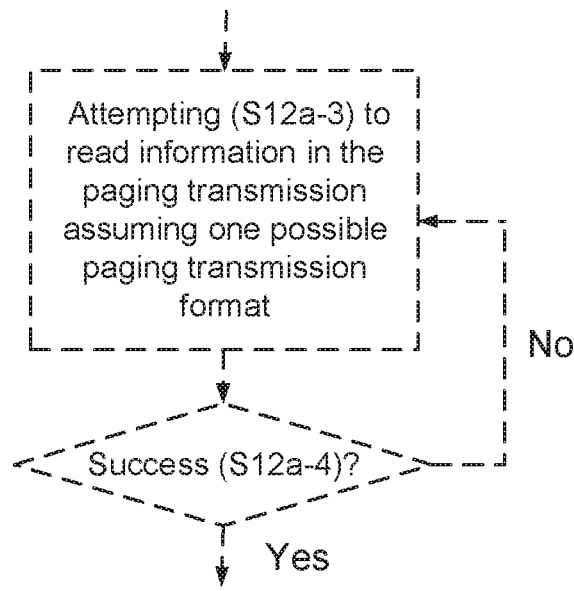

One example is that the wireless device detects individual paging messages blindly by attempting detection according to the possible formats. This implies for example that potential PICH locations are then blindly decoded according to the different possible paging transmission formats. In other words, according to some aspects the receiving S12 comprises attempting to read S12a-3 information in the paging transmission assuming one of the possible paging transmission formats at a time, until a the paging transmission is successfully read S12a-4 (Success=YES). This is illustrated in FIG. 3b, which shows the step of receiving S12 in more detail, according to some aspects of the proposed technique. FIG. 3b shows how the wireless device tries to decode or read the paging data assuming one format at the time as long as the message is not successfully read (Success=NO).

Figure 3C:
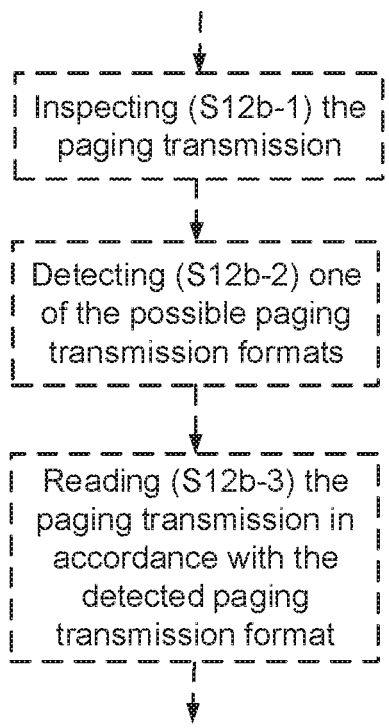

A second alternative, illustrated in FIG. 3c, is inspecting the paging indication to detect which paging transmission format is used, and to then decode, or read, the paging data applying to the detected paging transmission format. Inspection refers to e.g. observing the length of the message or presence of certain known characteristic bit sequences. FIG. 3b, shows the step of receiving S12 in more detail, according to some other aspects of the proposed technique. Hence, according to some aspects the receiving S12 comprises inspecting S12b-1 the paging transmission, detecting S12b-2 one of the two or more possible paging transmission formats and reading S12b-3 information in the paging transmission in accordance with the detected paging transmission format.

Depending on the read contents of PICH, the wireless device may perform required actions and/or read paging messages transmitted on the PMCH. Reading PCCH and PDCH is performed in a standard manner, using the DMRS of the relevant resource blocks as a phase reference.

The wireless device then performs S13 actions indicated by the received paging transmission. In other words, based on the received paging channel contents, the wireless device may then access the network, read system information, perform other actions according to the emergency messages, or do nothing. System access and system information acquisition follow the usual SSI-based procedures.

The paging transmission format might define the paging transmission in several ways, and is not limited to the examples above. If there are several possible paging transmission formats, then there are different ways of applying them.

Paging Transmission Formats

The concept of using paging transmission formats will now be explained in more detail. The paging transmission formats proposed herein are typically adapted for optimal paging message transmission in different scenarios. Depending on the paging transmission format, the paging transmission comprises one, two or several parts. Typically the paging transmission comprises a first part being a paging indication that indicates whether paging is in progress and that also potentially provides partial or full paging information for the concerned wireless devices. The paging indication may carry one or more of the following contents; a paging flag; a paging target: a target UE list; paging message; a pointer to one or more paging messages.

When a paging message is present, the paging message may carry a continuation of the paging indication such as one or more paging targets and paging data. The paging data can comprise an instruction to the wireless device, system information or emergency info to the wireless device, user data, etc. Hence, the paging transmission according to some aspects comprises a full or a partial list of targeted wireless devices.

Figure 4:
FIG. 4 discloses some exemplary paging transmission formats
Figure 4:
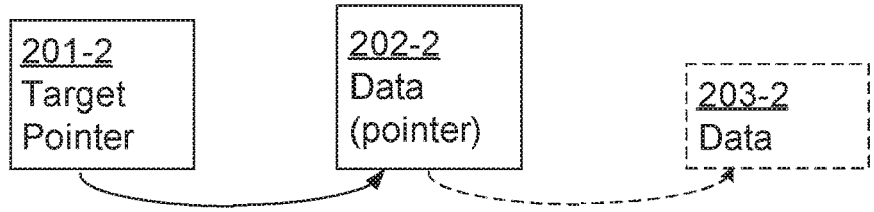
Figure 4:
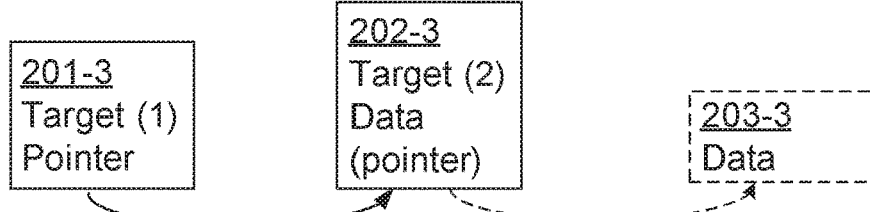
Figure 4:
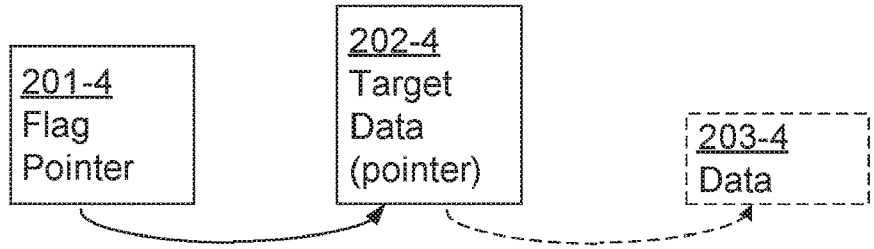
Figure 4:
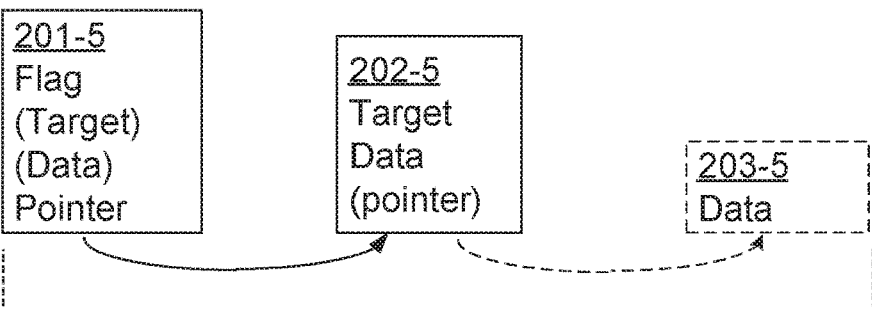

Hence, the contents of the different parts of the paging message is one aspect of the paging transmission format that will now be further explained referring to FIG. 4 disclosing some example paging transmission formats. In other words the paging transmission might be a single transmission or it might be divided into two (or more) parts, with inherent hierarchical (forward pointer) structure and contents of the individual parts According to some aspects in one of the two or more possible paging transmission formats, the paging transmission comprises only a paging indicator. In other words, the simplest paging transmission format, referred to as Format 1 in FIG. 4 comprises only a paging indication 201-1. The new radio interface of 5G, may enable high data rates. This implies that, it is sometimes possible to send a reasonable amount of data on the paging indication channel, PICH. Hence, if the channel conditions are favorable and if only a small amount of paging data needs to be transmitted, it might be possible to include the paging data in the indication. Thereby, a wireless device might receive the small amount of paging data by only receiving and decoding the paging indication.

However, in other situations, the paging transmission needs to be split up into two parts. Hence, in one of the two or more possible paging transmission formats the paging transmission comprises a paging indicator comprising a pointer to one or more paging messages. In other words, the paging indication 201 in FIG. 4 might comprise a pointer to one or several paging messages 202, 203. The paging indications and paging messages in FIG. 4 has a suffix X e.g. 201-X and 202-X indicating a corresponding Format X.

One possibility is a paging transmission format similar to the paging transmission format used in LTE, which is illustrated as Format 2. Format 2 comprises a paging indication 201-2 comprising information about a target corresponding to the C-RNTI in LTE and pointer to a succeeding paging message 202-2. This might be an alternative when the size of the data is too large to enable including it in the paging indication.

Sometimes, the paging transmission needs to be split up into more than two parts. According to some aspects, one or more of the paging messages comprises a pointer to one or more further paging messages. In other words, the paging messages 202-2 might also comprise a pointer to one or several further paging messages 203-2.

It is also possible that a paging targets several wireless devices. Then it might not be possible to fit all targets in the paging indication 201. Then a paging indication 201-3 comprises information defining a subset of the targets, but not all, and a pointer to a paging message 202-3. The paging message 202-3 then comprises the rest of the target list and the paging data associated with the paging, as shown in Format 3.

The paging transmission format might also comprise a paging flag. A paging flag is an indication of the presence of paging data to any device. If the paging indication comprises a flag but not necessarily further target information defining which wireless devices should listen to the page. In one possible transmission format referred to as Format 4, the indication comprises only a paging flag and a pointer to a paging message 202-4. Alternatively, the indication may comprise only a paging flag, and the pointer to the paging message 202-4 is pre-configured at the UE. The paging message 202-4 then comprises the target information. Hence, a wireless device detecting such a paging indication 201-4 has to decode the succeeding paging message 202-4 in order to know if it is paged or not.

An alternative to Format 4 is that the paging indication 201-5 also comprises some target information, see Format 5.

The paging transmission format might also define further aspects of the paging transmission, such as if the different parts of the paging transmission are transmitted in the same subframe, or if the second part i.e. the paging message is transmitted in a subframe subsequent to the sub frame in which the paging indication is transmitted. In the former case, the division into two parts does not cause any additional message delays, but may be beneficial to allow flexible channel mapping, discussed next.

The paging transmission format might also define how the different parts of the paging transmission are mapped into to physical channels. According to some aspects, the paging signals will use the signaling structures of the downlink control and/or data channels i.e. Physical Downlink Control Channel, PDCCH and Physical Downlink Channel, PDCH.

PDCCH is expected to support message sizes up to 40-50 bits, which can provide a resource allocation pointer to a PDCH, but offers a limited payload capability beyond that. PDCH can carry messages of "arbitrary" size, limited only by the resources that the network is willing to reserve for paging in a given subframe.

TABLE 1

Possible mapping options

| Mapping: | PICH | PMCH |
|---|---|---|
| a | PDCCH | — |
| b | PDCH | — |
| c | PDCCH | PDCH |
| d | PDCH | PDCH |

Paging Format Selection

As discussed above, different parameters may be considered when selecting the transmission format. While in many cases, numerous different format combinations may work functionally, certain options provide best performance in specific scenarios.

Different criteria that might affect the selection S3 of paging transmission format and how different criteria will affect the selection S3 will now be described and exemplified. The different criteria might of cause be combined and then the individual implementations need to sort out how the impact of the different criteria should be weighed. The sections above describe how different criteria affect the selection S3 of paging transmission format when paging one or several UEs in different scenarios.

Number of Targeted UEs or UE Groups

The number of targets wireless devices or groups of wireless devices generally affects the paging transmission format, as the paging transmission has to comprise information defining the targeted wireless devices.

Hence, generally a transmission format comprising several parts is selected when many wireless devices are targeted. In other words, a paging transmission format where the paging transmission comprises a paging indication and one or more paging messages is selected (or rather is preferably selected) in response to the number of targeted wireless devices or groups of wireless devices being above a threshold or in response to the size of a list of targeted wireless devices, or a list of targeted wireless device groups, being above a threshold.

Furthermore, generally a transmission format comprising one part is only an alternative when one or a few wireless devices are targeted. In other words, a paging transmission format where the paging transmission comprises only a paging indicator is selected in response to the number of targeted wireless devices or groups of wireless devices being below a threshold or in response to the size of a list of targeted wireless devices, or a list of wireless device groups, being below a threshold.

Some possible target list categories would for example be; single UE (or one UE groups), a small number of UEs (or UE groups) and a large number of UEs (or UE groups). Selection of Format (see FIG. 2) and mapping (see Table 1) could then be made as follows:

- Single UE (or UE group)→Format 1,2/Mapping a,c (Note that this includes the case where a single UE indication is used to indicate 'All UEs', e.g. in case of a warning message, in which case format 2, mapping c are suitable choices.)
- A small number, e.g. 1-5, of UEs (or UE groups)→Format 1,2/Mapping a,c
- A large number of UEs (or UE groups)→Format 3/Mapping b,d.

Paging Data/Payload Size

Another parameter that would affect the paging transmission format is the size of the paging data. The paging data is herein defined as the data that needs to be delivered to the UE or UEs in connection with the paging. So "paging data" can comprise an instruction to UE, system information or emergency info to UE, or user data, etc.

In general, when a lot of data needs to be transmitted, i.e. when the payload is large, then one part i.e. the paging indication, is not sufficient. In other words, a transmission format where the paging transmission comprises a one or more paging messages when the size of the payload data or payload is above a threshold.

Consequently the opposite also applies i.e. a transmission format where the paging transmission comprises only a paging indicator is selected in response to the size of the paging data and/or payload being below a threshold.

A wide range of payload (message) sizes may be supported in a solution according to the invention. Selection of Format (see FIG. 4) and mapping (see Table 1) could then be made as follows:

- A few bits→Format 1/Mapping a,b
- Some tens of bits→Format 1/Mapping b
- Many tens to hundreds of bits→Format 2,3/Mapping d.

Latency Constraints

The urgency of receiving the paging message may be addressed by using different formats. When the paging it is preferable to transmit the paging transmission in as few subframes as possible. Depending on channel allocation, this might be possible even when dividing the paging transmission into several parts, if the Paging Indication Channel, PICH and the Paging Message Channel are mapped within the same sub frame. However, a single part in generally preferable when for example transmitting a very small amount of urgent data to a single UE or groups of UEs.

Consequently, according to some aspects of the proposed technique, a transmission format where the paging transmission comprises only a paging indicator is selected in response to the latency constraints of the paging transmission being above a threshold.

According to some aspects, a transmission format where the paging transmission comprises a paging indication and one or more paging messages is selected in response to the latency constraints of the paging transmission being below a threshold.

Selection of Format (see FIG. 4) and mapping (see Table 1), with regards to different latency constraints could then be made as follows:

- Paging to trigger UE access or latency-sensitive MTC data→Format 1
- Emergency message or non-delay-sensitive data→Format 2,3 (allows PMCH in a later subframe/TTI)

Network Conditions and UE Constraints

Other parameters that might affect choice of paging transmission format are UE detection efficiency and network conditions and combination thereof.

Network conditions such as network load, resource usage, paging link quality are relevant for selection of paging transmission format. When load is high resource efficiency should be prioritized if possible i.e. if link quality is good enough. Hence, the UE detection efficiency and NW resource usage trade-offs may be decided based on the current network load and available resources.

Generally, a paging indicator comprising only a paging indication is selected in response to network load being above a threshold or in response to paging link quality being below or above a threshold. Consequently, a transmission format where the paging transmission comprises a paging indication and one or more paging messages is selected in response to the network load being below a threshold or in response to paging link quality being below a threshold.

UE receiver constraints according to some aspects also need to be considered. Depending on the deployment-dependent link quality of a UE at the edge of the coverage area and UE receiver constraints, the required code rate and thus achievable payload size may be limited.

Other parameters that might be taken into account are UE energy consumption optimization or other operator defined optimization targets.

Selection of Format (see FIG. 4) and mapping (see Table 1) could then be made as follows:

- High load→prioritize low resource usage→Format 1
- Low load→prioritize low-complexity page detection→Format 4,5
- Depending on whether PDCH or PDCCH resources are more scarce→Mapping a (for high load) or c (for low load), or mapping b (for high load) or d (for low load) respectively.
- High-frequency band (30-60 GHz) deployments typically exhibit small antenna element apertures and low path gain for non-beamformed broadcast transmission, suggesting low coding rate and larger resource usage→Mapping b,d
- It may be desirable to avoid UE multi-antenna operation (RX beamforming and beam scanning) for detecting a page, so low-SINR operating point must be supported for the detection→Format 4,5/Mapping c,d Purpose of the Page Another possibility is to map the paging transmission formats to the purpose of the paging. Some possible paging functions in NX are traditional paging, transmission of small amounts of data or transmission of emergency messages.

Selection of Format (see FIG. 4) and mapping (see Table 1) could then be made as follows:

- traditional paging to make a UE contact the network→short message but possibly large UE list→Format 1/Mapping a,b
- transmitting a small amount of data to a UE without the UE entering the active mode→variable, possibly "large" message but short UE list→Format 2/Mapping c
- emergency message and other broadcast message distribution→potentially large messages→Mapping c,d Example Paging Scenarios In real paging scenarios the different criteria discussed above occur in different combinations and then the individual implementations needs to sort out how the impact of the different criteria should be weighed. Below find some examples of paging scenarios and how corresponding paging transmission formats could be selected according to some example embodiments.

Selection of Format (see FIG. 4) and mapping (see Table 1) could then be made as follows:

Locating 1 or 2 UEs, "low" band→Format 1;

In these examples "Low" band refers from frequencies from LTE bands up to 6 GHz, and "High" band refers to higher frequency bands, typically above 15 GHz. In general, link SNR conditions in lower bands are more favorable, allowing more information to be sent in the PICH field. A UE monitors PICH on preconfigured Resource Blocks, RBs. If the UE detects paging notification on PICH targeting this UE, it performs required operations (e.g. UL access) included in the paging indication.

Locating several UEs and/or notification, "low" band-→Format 3;

A UE monitors PICH on preconfigured RBs. If the UE detects paging operation on PICH having Format 3, the UE reads PMCH. When the UE's own ID is found in PMCH, it performs required operations (e.g. UL access). If a paging data comprising other information is found in PMCH, the UE performs required actions (if any), e.g. notifies user of warning message.

Locating many UEs or single UE with user data delivery, "low" band→Format 1 to format 3;

A UE monitors PICH on preconfigured RBs. If the UE detects a paging indicator (Format 1) on PICH, that is targeting this UE, the UE performs required operations (e.g. UL access) and/or receives user data (as specified in indication).

Locating multiple UEs with a separate user data delivery for each or some UE(s), "low" band→Format 1 to format 3;

A UEs monitors PICH on preconfigured RBs. If the UE detects a paging indication PICH for this UE, the UE performs required operations (e.g. UL access) specified in the paging indication (Format 1) and/or (if Format 2 or Format 3 is used) the UE receives user data in PMCH at indicated resources.

Locating UE or notification, "high" band (low SNR w/o BF)→Format 4 or 5;

All UEs that monitor PICH on preconfigured RBs in this paging occasion detect the paging flag and read the target list in PMCH at indicated (or preconfigured) resources. If a UE finds its own ID in the target list, it reads message in PMCH at indicated (or preconfigured) resources and performs required actions (if any), e.g. notify user of warning message.

Some formats can be viewed as persistent scheduling where the Physical Downlink Channel, PDCH or Physical Downlink Control Channel, PDCCH, resources are preconfigured for the UE. The scheduler limitations may be mitigated by configuring several resources for the UE to monitor, at the expense of increase in UE processing. Note also those resources that a UE is configured to monitor for a paging channel (i.e. PICH or PMCH) may be used for other downlink transmissions when no page needs to be transmitted.

Example Implementations in a Network Mode

Figure 5:
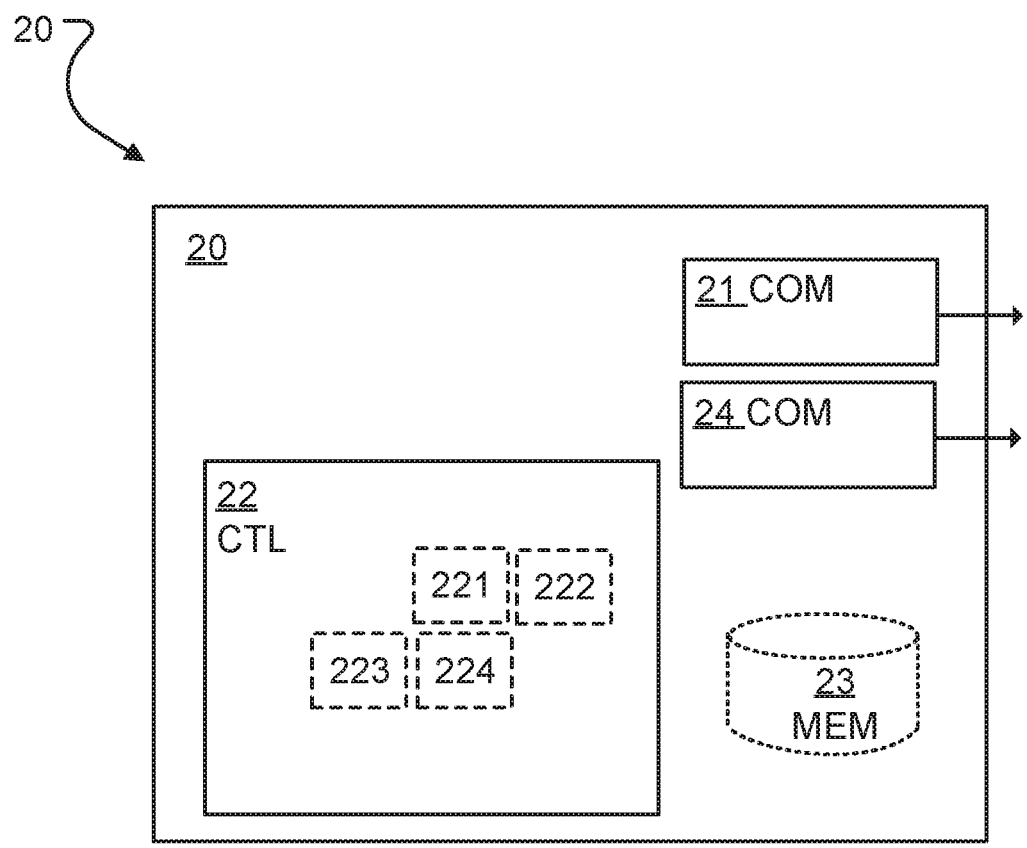
FIG. 5 is an example node configuration of a network node, according to some of the example embodiments.

Turning now to FIG. 5, a schematic diagram illustrating some modules of an example embodiment of a network node being configured for paging a wireless device. The network node 20 is typically a radio network node or base station, such as an eNodeB in LTE, providing wireless access to wireless devices within one or more areas referred to as cells. The network node is configured to implement the methods described in relation to FIG. 2.

The network node 20 comprises a radio communication interface (i/f) 21 configured for communication with wireless devices 10. The wireless communication interface 21 is arranged for wireless communication with other network nodes within range of the network node 20. The radio communication interface 21 may be adapted to communicate over one or several radio access technologies. If several technologies are supported, the node typically comprises several communication interfaces, e.g. one WLAN or Bluetooth communication interface and one cellular communication interface.

As shown in FIG. 5, the network node 20 according to some aspects comprises a network communication interface 24. The network communication interface 24 is configured for communication with other network nodes e.g. in a core network. This communication is often wired e.g. using fiber. However, it may as well be wireless.

The network node 20 comprises a controller, CTL, or a processing circuitry 22 that may be constituted by any suitable Central Processing Unit, CPU, microcontroller, Digital Signal Processor, DSP, etc. capable of executing computer program code. The computer program may be stored in a memory, MEM 23. The memory 23 can be any combination of a Read And write Memory, RAM, and a Read Only Memory, ROM. The memory 23 may also comprise persistent storage which, for example, can be any single one or combination of magnetic memory, optical memory, or solid state memory or even remotely mounted memory. According to some aspects, the disclosure relates to a computer program comprising computer program code which, when executed, causes a wireless device to execute the methods described above and below. According to some aspects the disclosure pertains to a computer program product or a computer readable medium holding said computer program.

The processing circuitry 22 is configured to cause the network node 20 to determine parameters for a paging transmission and to obtain two or more possible paging transmission formats. The processing circuitry 22 is further configured to cause the network node 20 to select one of the possible paging transmission formats, based on the determined parameters; and to transmit the paging transmission using the selected paging transmission format.

According to some aspects, the processing circuitry 22 is configured to cause the network node 20 to transmit a FD data signal in the Full Duplex mode with the downlink transmission power indicated to the wireless device.

According to some aspects, the determined parameters are at least one of; a number of targeted wireless devices or groups of wireless devices, the size of list of targeted wireless devices, or a list of wireless device groups, paging data or payload size, network load, latency constraints for the paging transmission, paging channel link quality, wireless device receiver constraints, radio resource limitations and/or a purpose of the paging transmission.

According to some aspects, in one paging transmission format the paging transmission comprises only a paging indicator.

According to some aspects, the processing circuitry 22 is configured to select of one of the two or more possible paging transmission formats, comprising only a paging indicator in response to at least one of the following parameter conditions; the number of targeted wireless devices or groups of wireless devices being below a threshold, the size of a list of targeted wireless devices, or a list of wireless device groups, being below a threshold, paging data and/or payload size being below a threshold, network load being above a threshold, the latency constraints of the paging transmission being above a threshold or paging link quality being above a threshold.

According to some aspects, in one paging transmission format the paging transmission comprises a paging indicator comprising a pointer to one or more paging messages.

According to some aspects, one or more of the paging messages comprises a pointer to one or more further paging messages.

According to some aspects, the processing circuitry 22 is configured to select one of the two or more possible paging transmission formats comprising a paging indication and one or more paging messages in response to at least one of the following parameter conditions; the number of targeted wireless devices or groups of wireless devices being above a threshold, the size of a list of targeted wireless devices, or a list of wireless device groups, being above a threshold, the paging data or payload size being above a threshold, the network load being below a threshold or the latency constraints of the paging transmission being below a threshold and paging link quality being below a threshold.

According to some aspects, the paging transmission comprises a full or a partial list of targeted wireless devices.

According to some aspects, the processing circuitry 22 is configured to obtain information defining the two or more possible paging transmission formats by receiving information defining the two or more possible paging transmission formats from another network node or by determining the two or more possible paging transmission formats autonomously in the network node.

According to some aspects, the two or more possible paging transmission formats are pre-configured in the network node.

According to some aspects the processing circuitry 22 or the network node 20 comprises modules configured to perform the methods described above. The modules are implemented in hardware or in software or in a combination thereof. The modules are according to one aspect implemented as a computer program stored in a memory 13 which run on the processing circuitry 12.

According to some aspects network node comprises a determiner 221 configured to determine parameters for a paging transmission.

According to some aspects network node comprises an obtainer 222 configured to obtain two or more possible paging transmission formats.

According to some aspects network node comprises a selector 223 configured to select one of the possible paging transmission formats, based on the determined parameters.

According to some aspects network node comprises transmitter module 224 configured to transmit a trigger defining when to start applying the at least one Full Duplex maximum power reduction parameter, to the wireless device.

Example Implementation in a Wireless Device

Figure 6:
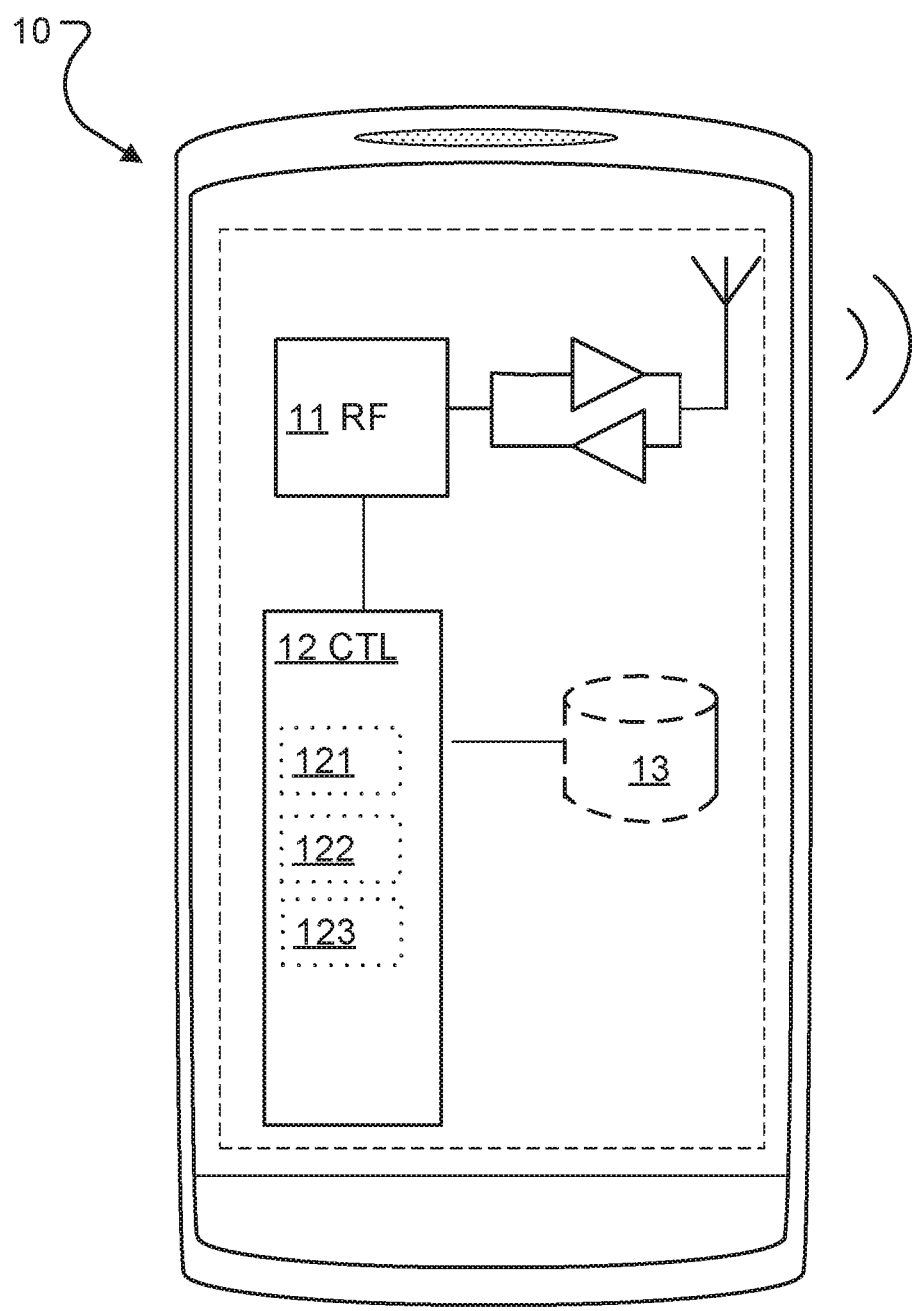
FIG. 6 is an example node configuration of a wireless device, according to some of the example embodiments.

FIG. 6 illustrates an example of a wireless device 10, which incorporates some of the example embodiments discussed above. FIG. 6 discloses a wireless device configured for receiving a paging transmission from a network node 20. The wireless device 10 is configured to implement the methods described in relation to FIG. 3.

A "wireless device" as the term may be used herein, is to be broadly interpreted to include a radiotelephone having ability for Internet/intranet access, web browser, organizer, calendar, a camera (e.g., video and/or still image camera), a sound recorder (e.g., a microphone), and/or Global Positioning System, GPS, receiver; a Personal Communications System, PCS, user equipment that according to some aspects combine a cellular radiotelephone with data processing; a Personal Digital Assistant, PDA, that can include a radiotelephone or wireless communication system; a laptop; a camera (e.g., video and/or still image camera) having communication ability; and any other computation or communication device capable of transceiving, such as a personal computer, a home entertainment system, a television, etc.

As shown in FIG. 6, the wireless device 10 comprises a radio communication interface or radio circuitry 11 configured to receive and transmit any form of communications or control signals within a network. It should be appreciated that the radio circuitry 11 is according to some aspects comprised as any number of transceiving, receiving, and/or transmitting units or circuitry. It should further be appreciated that the radio circuitry 11 is e.g. be in the form of any input/output communications port known in the art. The radio circuitry 11 e.g. comprises RF circuitry and baseband processing circuitry (not shown).

The wireless device 10 according to some aspects further comprises at least one memory unit or circuitry 13 that is in communication with the radio circuitry 11. The memory 13 is e.g. be configured to store received or transmitted data and/or executable program instructions. The memory 13 is e.g. configured to store any form of contextual data. The memory 13 is e.g. be any suitable type of computer readable memory and is e.g. be of volatile and/or non-volatile type The wireless device 10 further comprises processing circuitry 12 which configured to obtain information defining two or more possible paging transmission formats, and to receive a paging transmission in accordance with the two or more possible paging transmission formats. The processing circuitry is further configured to perform any of the aspects of the methods performed in a wireless device described above.

The processing circuitry 12 is e.g. any suitable type of computation unit, e.g. a microprocessor, Digital Signal Processor, DSP, Field Programmable Gate Array, FPGA, or Application Specific Integrated Circuit, ASIC, or any other form of circuitry. It should be appreciated that the processing circuitry need not be provided as a single unit but is according to some aspects provided as any number of units or circuitry.

The controller, CTL, or processing circuitry 12 is e.g. constituted by any suitable type of computation unit, e.g. a microprocessor, Central Processing Unit, CPU, microcontroller, Digital Signal Processor, DSP, Field Programmable Gate Array, FPGA, or Application Specific Integrated Circuit, ASIC, or any other form of circuitry capable of executing computer program code. The computer program is e.g. stored in a memory, MEM, 13. The memory 13 can be any combination of a Read And write Memory, RAM, and a Read Only Memory, ROM. The memory 13 in some situations also comprise persistent storage, which, for example, can be any single one or combination of magnetic memory, optical memory, or solid state memory or even remotely mounted memory. It should be appreciated that the processing circuitry need not be provided as a single unit but is according to some aspects provided as any number of units or circuitry. According to some aspects, the disclosure relates to a computer program comprising computer program code which, when executed, causes a wireless device to execute the methods described above and below.

According to some aspects, the processing circuitry 12 is configured to receive the paging transmission by reading information comprised in the received paging transmission in accordance with one of the two or more possible paging transmission formats.

According to some aspects, the processing circuitry 12 is configured to perform actions indicated by the received paging transmission.

According to some aspects, the processing circuitry 12 is configured to attempt to read information in the paging transmission assuming one of the possible paging transmission formats at a time, until a the paging transmission is successfully read.

According to some aspects, the processing circuitry 12 is configured to receive the paging transmission by inspecting the paging transmission, detecting one of the two or more possible paging transmission formats and reading information in the paging transmission in accordance with the detected paging transmission format.

According to some aspects, in one paging transmission format the paging transmission comprises only a paging indicator.

According to some aspects, in one paging transmission format the paging transmission comprises a paging indicator comprising a pointer to one or more paging messages.

According to some aspects, one or more of the paging messages comprises a pointer to one or more further paging messages.

According to some aspects, the processing circuitry 12 is configured to obtain the information defining two or more possible paging transmission formats by receiving information defining the two or more possible paging transmission formats from the network node or determining the two or more possible paging transmission formats autonomously in the wireless device.

According to some aspects, the processing circuitry 12 is configured to obtain possible paging transmission formats being pre-configured in the wireless device.

According to some aspects the wireless device 10 or the processing circuitry 12 comprises modules configured to perform the methods described above. The modules are implemented in hardware or in software or in a combination thereof. The modules are according to one aspect implemented as a computer program stored in a memory 13 which run on the processing circuitry 12.

According to some aspects the wireless device 10 or the processing circuitry 12 comprises an obtainer 120 configured to obtain information defining two or more possible paging transmission formats.

According to some aspects the wireless device 10 or the processing circuitry 12 comprises a capturer 121 configured to capture an audio signal comprising speech and converting the captured audio signal to voice data.

According to some aspects the wireless device 10 or the processing circuitry 12 comprises a receiver module 122 configured to receive a paging transmission, in accordance with one of the two or more possible paging transmission formats.

According to some aspects the wireless device 10 or the processing circuitry 12 comprises a performer 123 configured to perform actions indicated by the received paging transmission.

Aspects of the disclosure are described with reference to the drawings, e.g., block diagrams and/or flowcharts. It is understood that several entities in the drawings, e.g., blocks of the block diagrams, and also combinations of entities in the drawings, can be implemented by computer program instructions, which instructions can be stored in a computer-readable memory, and also loaded onto a computer or other programmable data processing apparatus. Such computer program instructions can be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved. Also, the functions or steps noted in the blocks can according to some aspects of the disclosure be executed continuously in a loop.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that performs particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The invention claimed is:

1. A method, performed in a network node, for paging a wireless device, the method comprising:
   determining parameters for a paging transmission;
   obtaining two or more possible paging transmission formats;
   selecting one of the two or more possible paging transmission formats, based on the determined parameters, wherein the determined parameters comprise a size of paging data, and wherein the one of the two or more possible paging transmission formats is selected based on the size of the paging data being above or below a threshold; and
   transmitting the paging transmission using the selected paging transmission format, wherein the selected paging transmission format defines whether the paging transmission is a single transmission or the paging transmission is divided into different message parts.

2. The method of claim 1, wherein the determined parameters are further at least one of:
   latency constraints for the paging transmission,
   paging channel link quality,
   wireless device receiver constraints, and/or
   a purpose of the paging transmission.

3. The method of claim 1, wherein in one of the two or more possible paging transmission formats, the paging transmission comprises only a paging indication.

4. The method of claim 1, wherein in one of the two or more possible paging transmission formats, the paging transmission comprises a paging indication comprising a pointer to one or more paging messages.

5. The method of claim 4, wherein the one or more paging messages comprise a pointer to one or more further paging messages.

6. The method of claim 1, wherein the paging transmission comprises a full or a partial list of targeted wireless devices.

7. The method of claim 1, wherein the obtaining comprises receiving information defining the two or more possible paging transmission formats from another network node or determining the two or more possible paging transmission formats autonomously in the network node.

8. The method of claim 1, wherein the two or more possible paging transmission formats are pre-configured in the network node.

9. A method, performed in a wireless device for receiving a paging transmission from a network node, the method comprising:
   obtaining information defining two or more possible paging transmission formats;
   receiving a paging transmission that is formatted in accordance with one of the two or more possible paging transmission formats, wherein the one of the two or more possible paging transmission formats is a paging transmission format that is selected based on a size of paging data being above or below a threshold, and wherein one of the two or more possible paging transmission formats defines whether the received paging transmission is a single transmission or the received paging transmission is divided into different message parts.

10. The method of claim 9, wherein the receiving comprises reading information comprised in the received paging transmission in accordance with the one of the two or more possible paging transmission formats.

11. The method of claim 9, further comprising:
    performing actions indicated by the received paging transmission.

12. The method of claim 9, wherein in one of the two or more possible paging transmission formats, the paging transmission comprises only a paging indication.

13. The method of claim 9, wherein in one of the two or more possible paging transmission formats, the paging transmission comprises a paging indication comprising a pointer to one or more paging messages.

14. The method of claim 13, wherein the one or more paging messages comprise a pointer to one or more further paging messages.

15. The method of claim 9, wherein the obtaining comprises receiving the information defining the two or more possible paging transmission formats from the network node or determining the two or more possible paging transmission formats autonomously in the wireless device.

16. The method of claim 9, wherein the obtaining comprises retrieving possible paging transmission formats that are being pre-configured in the wireless device.

17. The method of claim 9, further comprising:
    selecting a first one of the two or more possible paging transmission formats for use in a first attempt by performing one or more of:
       observing a length of the received paging transmission; and
       observing a presence of one or more known characteristic bit sequences of information encoded in the received paging transmission.

18. The method of claim 9, wherein the receiving comprises:
    attempting to read information in the paging transmission assuming one of the two or more possible paging transmission formats at a time, until the paging transmission is successfully read.

19. A network node in a communication system, the network node being configured for paging a wireless device, the network node comprising:
    a radio communication interface radio circuitry configured to communicate with wireless devices; and
    processing circuitry configured to cause the network node:
       to determine parameters for a paging transmission;
       to obtain two or more possible paging transmission formats;
       to select one of the two or more possible paging transmission formats, based on the determined parameters, wherein the determined parameters comprise a size of paging data, and wherein the one of the two or more possible paging transmission formats is selected based on the size of the paging data being above or below a threshold;
       to transmit the paging transmission using the selected paging transmission format, wherein the selected paging transmission format defines whether the paging transmission is a single transmission or the paging transmission is divided into different message parts.

20. The network node of claim 19, wherein the determined parameters are further at least one of:
   latency constraints for the paging transmission,
   paging channel link quality,
   wireless device receiver constraints, and/or
   a purpose of the paging transmission.

21. The network node of claim 19, wherein in one of the two or more possible paging transmission formats, the paging transmission comprises only a paging indication.

22. The network node of claim 19, wherein in one of the two or more possible paging transmission formats, the paging transmission comprises a paging indication comprising a pointer to one or more paging messages.

23. The network node of claim 19, wherein the one or more paging messages comprise a pointer to one or more further paging messages.

24. The network node of claim 19, wherein the paging transmission comprises a full or a partial list of targeted wireless devices.

25. The network node of claim 19, wherein the processing circuitry is configured to obtain information defining the two or more possible paging transmission formats by receiving information defining the two or more possible paging transmission formats from another network node or by determining the two or more possible paging transmission formats autonomously in the network node.

26. The network node of claim 19, wherein the two or more possible paging transmission formats are pre-configured in the network node.

27. A wireless device configured for receiving a paging transmission from a network node, the wireless device comprising:
   a radio communication interface configured to communicate with the network node; and
   processing circuitry configured to cause the wireless device:
      to obtain information defining two or more possible paging transmission formats; and
      to receive a paging transmission that is formatted in accordance with one of the two or more possible paging transmission formats, wherein the one of the two or more possible paging transmission formats is a paging transmission format that is selected based on a size of paging data being above or below a threshold, and wherein the one of the two or more possible paging transmission formats defines whether the received paging transmission is a single transmission or the received paging transmission is divided into different message part.

28. The wireless device of claim 27, wherein the processing circuitry is configured to receive the paging transmission by reading information comprised in the received paging transmission in accordance with the one of the two or more possible paging transmission formats.

29. The wireless device of claim 27, wherein the processing circuitry is configured to:
   perform actions indicated by the received paging transmission.

30. The wireless device of claim 27, wherein in one of the two or more possible paging transmission formats, the paging transmission comprises only a paging indication.

31. The wireless device of claim 27, wherein in one of the two or more possible paging transmission formats, the paging transmission comprises a paging indication comprising a pointer to one or more paging messages.

32. The wireless device of claim 27, wherein the one or more paging messages comprises a pointer to one or more further paging messages.

33. The wireless device of claim 27, wherein the processing circuitry is configured to obtain the information defining the two or more possible paging transmission formats by receiving the information defining the two or more possible paging transmission formats from the network node or by determining the two or more possible paging transmission formats autonomously in the wireless device.

34. The wireless device of claim 27, wherein the processing circuitry is configured to obtain possible paging transmission formats that are being pre-configured in the wireless device.

35. The wireless device of claim 27, wherein the processing circuitry is further configured to cause the wireless device:
   to select a first one of the two or more possible paging transmission formats for use in a first attempt by performing one or more of:
      observing a length of the received paging transmission; and
      observing a presence of one or more known characteristic bit sequences of information encoded in the received paging transmission.

36. A non-transitory computer readable storage medium comprising computer program code which, when executed by a network node, causes the network node to execute a method for paging a wireless device, the method comprising:
   determining parameters for a paging transmission, wherein the paging transmission comprises a paging indication that provides paging information for the wireless device;
   obtaining two or more possible paging transmission formats;
   selecting one of the two or more possible paging transmission formats, based on the determined parameters, wherein the determined parameters comprise a size of paging data, and wherein the one of the two or more possible paging transmission formats is selected based on the size of the paging data being above or below a threshold; and
   transmitting the paging transmission using the selected paging transmission format, wherein the selected paging transmission format defines whether the paging transmission is a single transmission or the paging transmission is divided into different message parts.

37. A non-transitory computer readable storage medium comprising computer program code which, when executed by a wireless device, causes the wireless device to execute a method for receiving a paging transmission from a network node, the method comprising:
   obtaining information defining two or more possible paging transmission formats;
   receiving a paging transmission that is formatted in accordance with one of the two or more possible paging transmission formats, wherein the one of the two or more possible paging transmission formats is a paging transmission format that is selected based on a size of paging data being above or below a threshold, and wherein the one of the two or more possible paging transmission formats defines whether the received paging transmission is a single transmission or the received paging transmission is divided into different message part.

38. The non-transitory computer readable storage medium of claim 37, wherein the method further comprises:
  selecting a first one of the two or more possible paging transmission formats for use in a first attempt by performing one or more of:
    observing a length of the received paging transmission; and
    observing a presence of one or more known characteristic bit sequences of information encoded in the received paging transmission.

* * * * *